(12) United States Patent
Maeda et al.

(10) Patent No.: US 8,596,053 B2
(45) Date of Patent: Dec. 3, 2013

(54) FLUIDIC TORQUE TRANSFER DEVICE

(75) Inventors: Koji Maeda, Anjo (JP); Kazuyoshi Ito, Tsushima (JP); Akihiro Nagae, Anjo (JP); Yoshihide Mori, Anjo (JP); Junya Kashimura, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 489 days.

(21) Appl. No.: 12/926,464

(22) Filed: Nov. 19, 2010

(65) Prior Publication Data

US 2011/0268592 A1 Nov. 3, 2011

(30) Foreign Application Priority Data

Nov. 19, 2009 (JP) ................................. 2009-263901
Mar. 31, 2010 (JP) ................................. 2010-080836

(51) Int. Cl.
*F16D 33/20* (2006.01)

(52) U.S. Cl.
USPC ............ 60/365; 60/367; 415/188; 416/197 C; 416/180

(58) Field of Classification Search
USPC ..... 416/223 B, DIG. 5, 197 C, 180; 415/188, 415/187, 191; 60/361, 362, 365, 367
See application file for complete search history.

(56) References Cited

U.S. PATENT DOCUMENTS

| | | | |
|---|---|---|---|
| 4,080,786 A | | 3/1978 | Ahlen |
| 5,058,027 A | * | 10/1991 | Becraft ............................ 700/97 |
| 6,289,674 B1 | * | 9/2001 | Halene et al. ................... 60/361 |
| 6,447,246 B1 | | 9/2002 | Abe et al. |
| 6,632,071 B2 | * | 10/2003 | Pauly ............................ 416/185 |
| 2003/0115862 A1 | | 6/2003 | Okada et al. |
| 2007/0108007 A1 | * | 5/2007 | Matsumoto et al. ......... 192/3.29 |

FOREIGN PATENT DOCUMENTS

| | | |
|---|---|---|
| JP | A-52-097074 | 8/1977 |
| JP | A-62-177354 | 8/1987 |
| JP | A-04-092145 | 3/1992 |
| JP | A-09-112649 | 5/1997 |
| JP | A-2000-110915 | 4/2000 |
| JP | A-2001-141026 | 5/2001 |
| JP | A-2002-544448 | 12/2002 |

(Continued)

OTHER PUBLICATIONS

Feb. 8, 2011 International Search Report issued in International Patent Application No. PCT/JP2010/070735 (with English translation).

(Continued)

*Primary Examiner* — Edward Look
*Assistant Examiner* — William Grigos
(74) *Attorney, Agent, or Firm* — Oliff & Berridge, PLC

(57) ABSTRACT

A fluidic torque transfer device is configured such that the attachment angle of a turbine blade at a fluid outlet of a turbine runner is smaller than the attachment angle of the turbine blade at a fluid inlet of the turbine runner. Furthermore, the turbine runner is structured so that a cross-sectional area St of a turbine flow path defined by the turbine shell, adjacent turbine blades, and the turbine core, which is perpendicular to a centerline of the turbine flow path, satisfies |St−Sref|/Sref≤0.2, where a reference area Sref is an average of maximum and minimum values of a cross-sectional area of a pump flow path defined by the pump shell, adjacent pump blades, and the pump core of the pump impeller, which is perpendicular to a centerline of the pump flow path.

9 Claims, 10 Drawing Sheets

(56) References Cited

FOREIGN PATENT DOCUMENTS

| | | |
|---|---|---|
| JP | A-2003-194185 | 7/2003 |
| JP | A-2007-132459 | 5/2007 |
| JP | A-2008-196646 | 8/2008 |
| WO | WO 00/68599 | 11/2000 |

OTHER PUBLICATIONS

Feb. 8, 2011 International Search Report issued in PCT/JP2010/070734 (with translation).
May 9, 2013 Office Action issued in U.S. Appl. No. 12/926,466.
Maeda et al., U.S. Appl. No. 12/926,466, filed Nov. 19, 2010.

* cited by examiner

F I G . 1
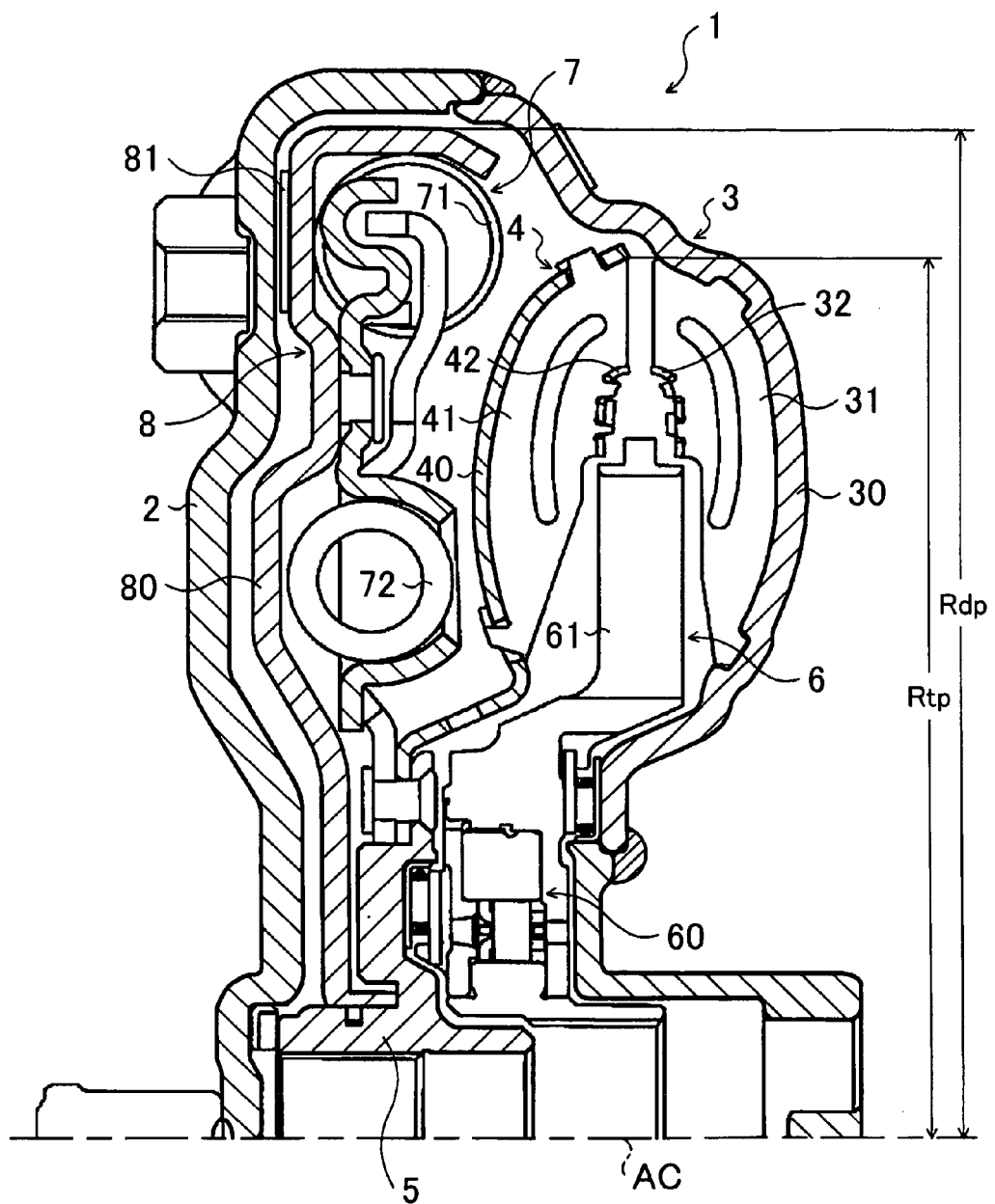

F I G . 4
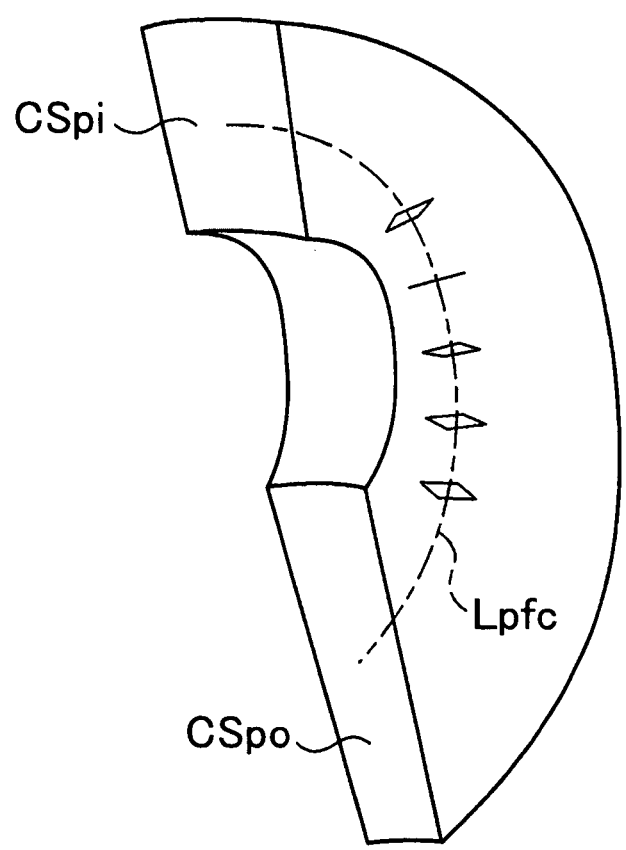

F I G . 7
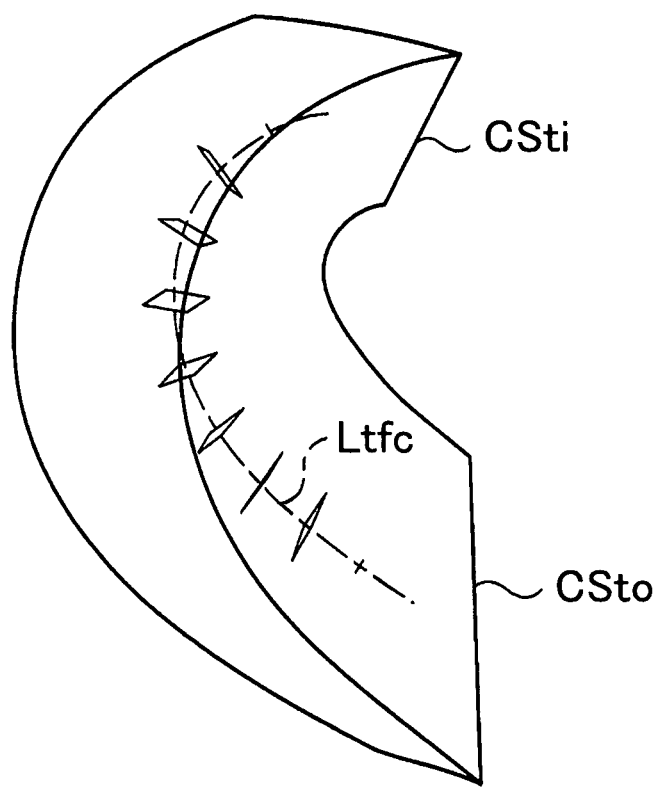

FLUIDIC TORQUE TRANSFER DEVICE

INCORPORATION BY REFERENCE

The disclosure of Japanese Patent Application Nos. 2009-263901 and 2010-080836 filed on Nov. 19, 2009 and Mar. 31, 2010, respectively, including the specification, drawings and abstract is incorporated herein by reference in its entirety.

BACKGROUND OF THE INVENTION

The present invention relates to a fluidic torque transfer device including: a pump impeller that includes a pump shell, pump blades, and a pump core; a turbine runner that includes a turbine shell, turbine blades, and a turbine core; and a stator that includes stator blades and rectifies a flow of a hydraulic fluid from the turbine runner to the pump impeller.

DESCRIPTION OF THE RELATED ART

Conventionally known fluidic torque transfer devices of this type include a torque converter that includes a front cover, a pump (a pump impeller) as a doughnut-shaped impeller fixed to the front cover, a turbine (a turbine runner) as a doughnut-shaped impeller having blades that face blades of the impeller, and a stator rotatably provided between the impeller and the turbine. The outer shapes of the pump impeller and the turbine runner in this type of torque converter are generally formed symmetrical to one another. However, in some torque converters, the outer shapes of the pump impeller and the turbine runner seem to be formed asymmetrical to one another (see Japanese Patent Application Publication No. JP-A-2007-132459, for example).

Conventionally, the following method is known as a method for designing an internal flow path of a torque converter having a flat cross section. A torque converter is formed so that the flatness (2 L/H) and the ratio (r/R) of the inner radius to the outer radius of a torus satisfy $0.55 < (2L/H) < 0.75$ and $0.35 < (r/R) < 0.40$, and the shape of the outer peripheral surface that defines an internal flow path of a turbine runner is set so that a contact point between a straight line having a gradient of 45 degrees and a curve that forms the outer peripheral surface of the flow path of the turbine runner is located in a region surrounded by two straight lines represented by $Y = (R/L) \times X + (6/4) \times R$ and $Y = (R/L) \times X + (7/4) \times R$, where the origin is the center position on a rotation axis, the X direction represents an axial direction, and the Y direction represents a radial direction (see Japanese Patent Application Publication No. JP-A-2001-141026, for example). In the technique described in Japanese Patent Application Publication No. JP-A-2001-141026, the final shape of the internal flow path of the turbine runner is set by setting the shape of the outer peripheral surface of the turbine runner in the manner described above, and setting the shape of the inner peripheral surface so that the flow path has the same cross-sectional area at any sectional position, that is, so that oil circulating in the flow path has the same speed component at any position.

SUMMARY OF THE INVENTION

To downsize a fluidic torque transfer device such as a torque converter, simply reducing the size of the fluidic torque transfer device in which the outer shapes of the pump impeller and the turbine runner are symmetrical to one another also reduces the torque capacity of the fluidic torque transfer device. If the outer shapes of the pump impeller and the turbine runner are symmetrical to one another, a cross-sectional area of a flow path is smaller at a flow path outlet of the turbine than at a flow path inlet thereof, whereby flow separation occurs in some cases. Reducing the size of the fluidic torque transfer device in which the outer shapes of the pump impeller and the turbine runner are symmetrical to one another may promote the occurrence of such a flow separation problem, and thus further reduce the torque capacity. On the other hand, as with the torque converter described in Japanese Patent Application Publication No. JP-A-2007-132459, there are torque converters in which the outer shapes of the pump impeller and the turbine runner seem to be formed asymmetrical to one another. Japanese Patent Application Publication No. JP-A-2007-132459 does not disclose any method of designing the outer shapes, and it is not clear from the description of Japanese Patent Application Publication No. JP-A-2007-132459 whether or not making the pump impeller and the turbine runner asymmetrical to one another contributes to downsizing of the fluid torque transfer device and to ensuring the torque capacity. Even if a contribution is made, such a satisfactory fluid transfer device in practical use cannot be obtained because no specific design method is disclosed. On the other hand, a reduction in torque capacity of the torque converter can be suppressed by setting the shape of the internal flow path of the turbine runner so that the flow path has the same cross-sectional area at any sectional position as described in Japanese Patent Application Publication No. JP-A-2001-141026. However, the number of turbine blades and the attachment angle thereof vary from device to device, and it is virtually impossible to set the internal flow path of the turbine runner so that the flow path has the same cross-sectional area at any sectional position. Thus, in the fluidic torque transfer devices such as torque converters, it is not easy to ensure the torque capacity and the torque amplification performance and downsize the device at the same time.

It is a main object of the present invention to downsize a fluidic torque transfer device while suppressing a reduction in torque capacity.

A fluidic torque transfer device of the present invention adopts the following means to achieve the above main object.

A fluidic torque transfer device of the present invention includes: a pump impeller that includes a pump shell, a pump blade attached to the pump shell, and a pump core attached to the pump blade; a turbine runner that includes a turbine shell, a turbine blade attached to the turbine shell, and a turbine core attached to the turbine blade; and a stator that includes a stator blade and rectifies a flow of a hydraulic fluid from the turbine runner to the pump impeller. In the fluidic torque transfer device, an attachment angle of the turbine blade at a fluid outlet of the turbine runner is smaller than the attachment angle of the turbine blade at a fluid inlet of the turbine runner, and the turbine runner is structured so that a cross-sectional area St of a turbine flow path defined by the turbine shell, adjacent turbine blades, and the turbine core, which is perpendicular to a centerline of the turbine flow path, satisfies $|St - Sref|/Sref \leq 0.2$, where a reference area Sref is an average of maximum and minimum values of a cross-sectional area of a pump flow path defined by the pump shell, adjacent pump blades, and the pump core of the pump impeller, which is perpendicular to a centerline of the pump flow path.

One possible method to downsize the fluidic torque transfer device is to flatten a torus defined by the pump impeller and the turbine runner as much a possible. However, in the case where the attachment angle of the turbine blade at the fluid outlet is smaller than that at the fluid inlet, simply flattening, e.g., a symmetrical torus reduces the capacity of the turbine flow path defined by the turbine shell, adjacent turbine blades, and the turbine core, especially in the region from near the center between the turbine inlet and the turbine outlet to the turbine outlet, whereby the torque capacity of the fluidic torque transfer device can be reduced. Moreover, in the fluidic torque transfer device including the stator, it is preferable to make the attachment angle of the turbine blade smaller at the fluid outlet of the turbine runner than at the fluid inlet thereof, in order to increase the torque amplification performance. However, simply reducing the attachment angle of the turbine blade at the fluid outlet of the turbine runner reduces the cross-sectional area of the turbine flow path near the fluid outlet of the turbine runner, thereby possibly reducing the torque capacity and causing flow separation near the fluid outlet. Thus, in order to more properly flatten the torus in view of the direction of the fluid flow in the turbine flow path, the inventors analyzed a variation range of the cross-sectional area of the turbine flow path, which is allowable to satisfactorily ensure the torque capacity and the torque amplification performance, based on the cross-sectional area of the pump flow path in which a variation range of flow path capacity from the pump inlet to the pump outlet, which is caused by flattening of the torus, is smaller than the turbine flow path due to the attachment angle and the degree of torsion of the pump blade. Based on the analysis result, the inventors found that a practically satisfactory result can be obtained by structuring the turbine runner asymmetrical to the pump impeller so that the cross-sectional area St of the turbine flow path defined by the turbine shell, adjacent turbine blades, and the turbine core, which is perpendicular to the centerline of this turbine flow path, satisfies $|St-Sref|/Sref \leq 0.2$, where the reference area Sref is the average of the maximum and minimum values of the cross-sectional area of the pump flow path defined by the pump shell of the pump impeller,—adjacent pump blades, and the pump core,—which is perpendicular to the centerline of this pump flow path. That is, by structuring the turbine runner so that the cross-sectional area St of the turbine flow path satisfies $|St-Sref|/Sref \leq 0.2$, the torus can be flattened and thus the fluidic torque transfer device can be downsized while ensuring a practically sufficient torque capacity according to the outer diameter of the torus, and increasing torque amplification performance.

The turbine runner may be structured so that the cross-sectional area St of the turbine flow path satisfies $|St-Sref|/Sref \leq 0.15$. Thus, a practically highly satisfactory torque capacity according to the outer diameter of the torus can be ensured while flattening the torus.

Moreover, a radius of an inscribed circle inscribed at the fluid outlet of the turbine runner on an outer contour line of the turbine blade on the turbine shell side and an inner contour line of the turbine blade on the turbine core side may be larger than a radius of an inscribed circle inscribed on the outer contour line and the inner contour line at the fluid inlet of the turbine runner, and the outer contour line of the turbine blade may extend outward in an extending direction of a rotation center axis of the pump impeller and the turbine runner on the fluid outlet side of the turbine runner more than an outer contour line of the pump blade on the pump shell side. Thus, even if the attachment angle of the turbine blade at the fluid outlet of the turbine runner is reduced, and the torus is flattened, a sufficient cross-sectional area of the flow path defined between adjacent turbine blades can be ensured in a region on the fluid outlet side of the turbine runner, and a variation range of the cross-sectional area of the fluid path from the fluid inlet to the fluid outlet of the turbine runner can be reduced. As a result, in this fluidic torque transfer device, the torque amplification performance is increased and the fluidic torque transfer device can be downsized while suppressing a reduction in torque capacity, and suppressing flow separation near the fluid outlet of the turbine runner.

The fluidic torque transfer device may be structured so that a length from a device centerline to a farthest portion located farthest from the device centerline in the extending direction of the rotation center axis of the turbine blade is longer than a length from the device centerline to a farthest portion located farthest from the device centerline in the extending direction of the rotation center axis of the pump blade, wherein the device centerline is a line that extends through a center between a fluid outlet outer peripheral end of the pump blade and a fluid inlet outer peripheral end of the turbine blade that face each other, extends through the rotation center axis of the pump impeller and the turbine runner, and extends perpendicular to the rotation center axis. Thus, regarding the pair of the pump blade and the turbine blade, the length from the device centerline to the farthest portion located farthest from the device centerline in the extending direction of the rotation center axis of the turbine blade is made longer than the length from the device centerline to the farthest portion located farthest from the device centerline in the extending direction of the rotation center axis of the pump blade. This enables the outer contour line of the turbine blade to extend outward more properly in the extending direction of the rotation center axis in a region on the turbine outlet side of the turbine runner, as compared to the outer contour line of the pump blade, and a variation range of the cross-sectional area of the flow path from the fluid inlet to the fluid outlet of the turbine runner can be reduced as much as possible. As a result, when the variation range of the cross-sectional area of the turbine flow path is within the above range, the torus can be flattened and thus the fluidic torque transfer device can be downsized while ensuring a torque capacity according to the outer diameter of the torus.

Moreover, the outer contour line of the turbine blade may have a symmetrical region where the outer contour line of the turbine blade is symmetrical to the outer contour line of the pump blade, and an asymmetrical region where the outer contour line of the turbine blade is not symmetrical to the outer contour line of the pump blade, wherein the symmetrical region may include the fluid inlet outer peripheral end of the turbine blade, and the asymmetrical region may include a fluid outlet inner peripheral end of the turbine blade. This enables the hydraulic fluid to smoothly flow from the pump impeller into the turbine runner, whereby the torque transfer loss can be reduced.

BRIEF DESCRIPTION OF THE DRAWINGS

FIG. 1 is a schematic structural diagram of a torque converter 1 as a fluidic torque transfer device according to an embodiment of the present invention;

FIG. 4 is a schematic diagram showing, by way of example, a pump flow path;

FIG. 7 is a schematic diagram showing, by way of example, a turbine flow path;

DETAILED DESCRIPTION OF THE EMBODIMENTS

Figure 2:
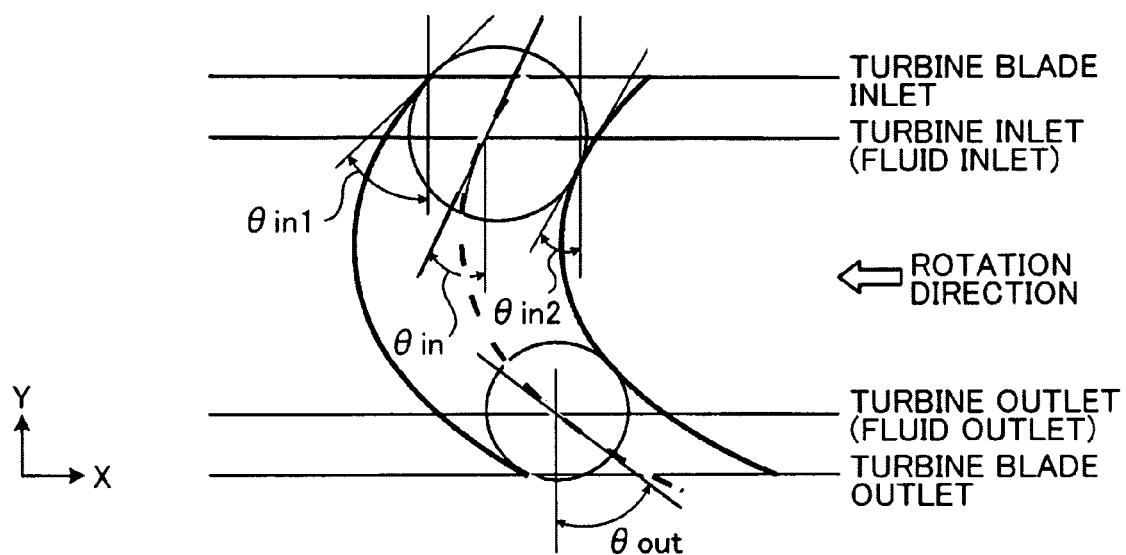
FIG. 2 is an explanatory diagram that illustrates the attachment angle of turbine blades.

A mode for carrying out the present invention will be described below based on an embodiment.

FIG. 1 is a schematic structural diagram of a torque converter 1 as a fluidic torque transfer device according to an embodiment of the present invention. The torque converter 1 shown in the figure is a torque converter that is mounted on vehicles including an engine, and as shown in FIG. 1, the torque converter 1 includes a front cover (an input member) 2, a pump impeller (a fluid transmission element) 3, a turbine runner (a fluid transmission element) 4, a turbine hub (an output member) 5, a stator 6, a damper unit 7, and a lockup clutch mechanism 8. A crankshaft (an output shaft) of an engine, not shown, is fixed to the front cover 2. An input shaft (not shown) of an automatic transmission (AT) or a continuously variable transmission (CVT), not shown, is fixed (spline-fitted) to the turbine hub 5.

The pump impeller 3 has a pump shell 30, a plurality of pump blades 31 attached (fixed) to the inner surface of the pump shell 30, and a pump core 32 attached (fixed) to the inner edges of the pump blades 31. The pump shell 30 is closely fixed to the front cover 2. The turbine runner 4 has a turbine shell 40, a plurality of turbine blades 41 attached (fixed) to the inner surface of the turbine shell 40, and a turbine core 42 attached (fixed) to the inner edges of the turbine blades 41. The turbine shell 40 is fixed to the turbine hub 5. The pump impeller 3 on the front cover 2 side faces the turbine runner 4 on the turbine hub 5 side, and the stator 6 having a plurality of stator blades 61 capable of rotating coaxially with the front cover 2 is arranged between the pump impeller 3 and the turbine runner 4. The stator 6 has a one-way clutch 60 that sets the rotation direction of the stator 6 to only one direction. The pump impeller 3, the turbine runner 4, and the stator 6 form a torus (an annular flow path) that circulates hydraulic oil (hydraulic fluid). The stator 6 rectifies the flow of the hydraulic oil from a turbine outlet that is a fluid outlet of the turbine runner 4 to a pump inlet that is a fluid inlet of the pump impeller. The damper unit 7 has a plurality of springs 71 and a plurality of springs 72, and together with the turbine shell 40, is fixed to the turbine hub 5. The lockup clutch mechanism 8 includes a lockup piston 80, and a friction plate 81 bonded to the surface of the lockup piston 80.

In the torque converter 1 thus structured, when the engine, not shown, is operated, and the front cover 2 and the pump impeller 3 rotate, the flow of the hydraulic oil from a pump outlet on the outer peripheral side of the pump impeller 3 to a turbine inlet on the outer peripheral side of the turbine runner 4 forces the turbine runner 4 to start rotating, and the power from the engine is transmitted from the front cover 2 to the turbine hub 5 via the turbine runner 4 (the hydraulic oil). When the difference in rotational speed between the pump impeller 3 and the turbine runner 4 is large, the stator 6 switches the flow of the hydraulic oil to a direction that assists rotation of the pump impeller 3. Thus, the torque converter 1 operates as a torque amplifier when the difference in rotational speed between the pump impeller 3 and the turbine runner 4 is large. As the difference in rotational speed therebetween decreases, the stator 6 runs idle via the one-way clutch 60, and thus operates as a fluid coupling. If predetermined conditions are satisfied (e.g., if the vehicle speed reaches a predetermined value) after the vehicle starts off, the lockup clutch mechanism 8 is operated, and the power transmitted from the engine to the front cover 2 is directly transmitted to the turbine hub 5 as the output member, whereby the engine is mechanically directly coupled to the input shaft of the transmission. Fluctuations in the torque that is transmitted from the front cover 2 to the turbine hub 5 are absorbed by the damper unit 7.

Here, in the torque converter 1 of the embodiment, the number of pump blades 31 of the pump impeller 3 is different from the number of turbine blades 41 of the turbine runner 4 in order to suppress the occurrence of unexpected resonances (e.g., the number of pump blades 31 is slightly more than the number of turbine blades 41 in order to increase the amount of hydraulic oil that is raked up). The attachment angle of each turbine blade 41 to the turbine shell 40 (the angle of the flow immediately after the hydraulic oil flows into the blades) is set to be smaller (somewhat more acute) than the attachment angle of each pump blade 31 to the pump shell 30, and torsion is applied to each turbine blade 41. In the embodiment, the difference between the attachment angle of the pump blades 31 at the pump inlet and the attachment angle of the pump blades 31 at the pump outlet is set to be smaller than the difference between the attachment angle of the turbine blades 41 at the turbine inlet and the attachment angle of the turbine blades 41 at the turbine outlet. Moreover, the average value (the average value from the pump inlet to the pump outlet) of the attachment angle of the pump blades 31 in the pump impeller 3 is set to be larger than the average value (the average value from the turbine inlet to the turbine outlet) of the attachment angle of the turbine blades 41 in the turbine runner 4.

Note that the attachment angle of the turbine blades can be obtained as shown in FIG. 2. That is, the attachment angle ($\theta$in) at the turbine inlet (the fluid inlet) is expressed as $$\theta in=(\theta in1+\theta in2)/2$$

where, $\eta in1$ represents an angle that is formed by a tangent from a turbine blade inlet endpoint with respect to a perpendicular in the Y direction, and $\theta in2$ represents an angle that is formed by a tangent to a point of contact between an adjacent blade and an inscribed circle with respect to a perpendicular in the Y direction when the inscribed circle contacting a blade outer contour line adjacent to the turbine blade inlet endpoint is drawn. The attachment angle ($\theta$out) at the turbine outlet (the fluid outlet) is expressed as $$\theta out=(\theta out1+\theta out2)/2$$

where, $\theta out1$ represents an angle that is formed by a tangent from a turbine blade outlet endpoint with respect to a perpendicular in the Y direction, and $\theta out2$ represents an angle that is formed by a tangent to a point of contact between an adjacent blade and an inscribed circle with respect to a perpendicular in the Y direction when the inscribed circle contacting a blade outer contour line adjacent to the turbine blade outlet endpoint is drawn. The attachment angle of the turbine blades at the turbine outlet being smaller than that of the turbine blades at the turbine inlet means that the absolute value of $\theta$out is smaller than the absolute value of $\theta$in.

Moreover, in the embodiment, the attachment angle of each turbine blade 41 at the turbine outlet that is the fluid outlet of the turbine runner 4 is set to be smaller than the attachment angle of each turbine blade 41 at the turbine inlet that is the fluid inlet of the turbine runner 4, in order to make it easier for the hydraulic oil flowing out from the fluid outlet of the turbine runner 4 to strike the stator blades 61 of the stator 6. The pump impeller 3 and the turbine runner 4 are formed so as to have slightly smaller diameters compared to a conventional torque converter, and configure a torus that is flattened compared to the conventional torque converter. Thus, the torque converter 1 of the embodiment is made compact as a whole, and has a sufficient amount of space for mounting the damper unit 7. However, if the attachment angle of each turbine blade 41 at the turbine outlet is reduced, and the pump impeller 3 and the turbine runner 4 are flattened and the diameters thereof are reduced as described above, the cross-sectional area of the flow path defined between adjacent turbine blades 41 is reduced near the turbine outlet, which can reduce the torque capacity, and in some cases, cause flow separation near the turbine outlet.

Figure 3:
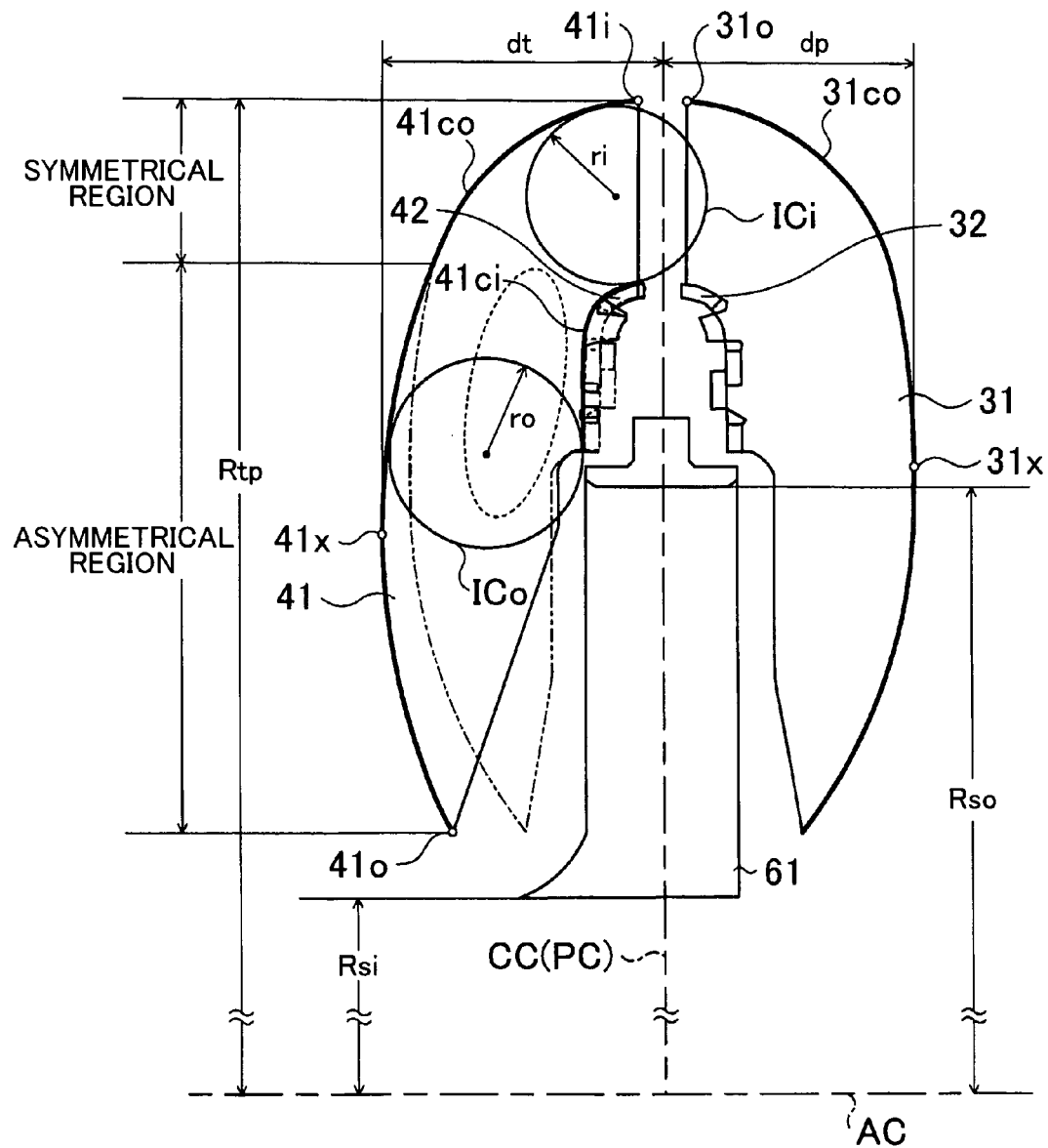
FIG. 3 is a schematic diagram for illustrating the structure of the torque converter 1.

Thus, as shown in FIG. 3, the turbine runner 4 that forms the torque converter 1 of the embodiment is structured such that a radius ro of an inscribed circle ICo that is inscribed on an outer contour line 41co of the turbine blade 41 on the turbine shell 40 side and an inner contour line 41ci of the turbine blade 41 (the inner peripheral end of the inner contour line 41ci) on the turbine core 42 side at the turbine outlet (the fluid outlet) is larger than a radius ri of an inscribed circle ICi that is inscribed on the outer contour line 41co and the inner contour line 41ci (the outer peripheral end of the inner contour line 41ci) at the turbine inlet (the fluid inlet), and such that the outer contour line 41co of the turbine blade 41 extends outward in the extending direction of a rotation center axis AC of the pump impeller 3 and the turbine runner 4 on the turbine outlet side more than an outer contour line 31co of the pump blade 31 on the pump shell 30 side. That is, the torque converter 1 of the embodiment has an asymmetrical structure in which the pump impeller 3 and the turbine runner 4 are asymmetrical to one another and an asymmetrical torus (an annular flow path) is formed by the pump impeller 3, the turbine runner 4, and the stator 6.

Moreover, as shown in FIG. 3, a straight line that extends through the rotation center axis AC and the midpoint (the center) between an outlet outer peripheral end 310 of any of the pump blades 31 and an inlet outer peripheral end 41i of any of the turbine blades 41 when the outlet outer peripheral end 31o faces the inlet outer peripheral end 41i, and that extends perpendicular to the rotation center axis AC is defined as a "device centerline CC." If the device centerline CC is defined as described above, the outer contour line 41co of the turbine blade 41 is the outer edge on the turbine shell 40 side in a projected image of the turbine blade 41 formed when the turbine blade 41 is projected onto a plane that includes the device centerline CC and the rotation center axis AC, in the state where the outlet outer peripheral end 310 faces the inlet outer peripheral end 41i. The inner contour line 41ci of the turbine blade is the inner edge on the turbine core 42 side in the projected image of the turbine blade 41 formed when the turbine blade 41 is projected onto the plane that includes the device centerline CC and the rotation center axis AC. Moreover, the outer contour line 31co of the pump blade 31 is the outer edge on the pump shell 30 side in a projected image of the pump blade 31 formed when the pump blade 31 is projected onto the plane that includes the device centerline CC and the rotation center axis AC.

In the embodiment, as shown in FIG. 3, a length dt from the device centerline CC to a farthest point (a farthest portion) 41x of the corresponding turbine blade 41 located farthest from the device centerline CC in the extending direction of the rotation center axis AC is made longer than a length dp from the device centerline CC to a farthest point (a farthest portion) 31x of the corresponding pump blade 31 located farthest from the device centerline CC in the extending direction of the rotation center axis AC, so that the outer contour line 41co of the turbine blade 41 extends outward in the extending direction of the rotation center axis AC on the turbine outlet side more than the outer contour line 31co of the pump blade 31 on the pump shell 30 side. If a plane that includes the midpoint between the outlet outer peripheral end 31o and the inlet outer peripheral end 41i and extends perpendicular to the rotation center axis AC is defined as a device center plane PC, the distance (=dt) from the device center plane PC to the farthest point 41x of each turbine blade 41 is longer than the distance (=dp) from the device center plane PC to the farthest point 31x of each pump blade 31. Thus, the distance (=dt) from the device center plane PC to the most inward portion of the inner surface of the turbine shell 40 is longer than the distance (=dp) from the device center plane PC to the most inward portion of the inner surface of the pump shell 30. That is, the turbine runner 4 included in the torque converter 1 of the embodiment is expanded (extended) outward and in the extending direction of the rotation center axis AC in a region from near the center portion between the turbine inlet and the turbine outlet to the turbine outlet more than a turbine runner structured so as to be approximately symmetrical to the pump impeller 3 (see the two-dotted chain line in FIG. 3). Thus, the torque converter 1 has a torus that is asymmetrical with respect to the device centerline CC (the device center plane PC).

Moreover, in order to more properly flatten the torus (the turbine runner 4) in view of the direction of the fluid flow in the turbine flow path, a variation range of the cross-sectional area of the turbine flow path, which is allowable to satisfactorily ensure the torque capacity, was analyzed based on the cross-sectional area of the pump flow path whose variation in flow path capacity from the pump inlet to the pump outlet, which is caused by flattening of the torus, is smaller than that of the turbine flow path due to the attachment angle and the degree of torsion of the pump blades 31. Based on the analysis result, the turbine runner 4 of the torque converter 1 of the embodiment is structured so that the cross-sectional area St of a turbine flow path defined by the turbine shell 40, adjacent turbine blades 41, and the turbine core 42, which is perpendicular to the centerline of the turbine flow path, satisfies |St−Sref|/Sref≤0.1, where the reference area Sref is the average of the maximum and minimum values of the cross-sectional area of a pump flow path defined by the pump shell 30 of the pump impeller 3, adjacent pump blades 31, and the pump core 32, which is perpendicular to the centerline of the pump flow path.

The analysis of the variation range of the cross-sectional area of the turbine flow path will be described below. First, (J+1) points obtained by equally dividing the inner peripheral edge (the boundary between the pump blade 31 and the pump core 32) of one pump blade 31 fixed to the pump shell 30 and the pump core 32 into J parts in a three-dimensional space are represented by Ppi(j) (where "J" is an integer of 2 or more, and "j" is an integer satisfying 1≤j≤J+1). (J+1) points obtained by equally dividing the outer peripheral edge (the boundary between the pump shell 30 and the pump blade 31) of the one pump blade 31 into J parts in a three-dimensional space are represented by Ppo(j). A three-dimensional curve formed by the midpoints of segments connecting the points Ppi(j) and the points Ppo(j) in the range of j=1 to J+1 is defined as the pump blade centerline. Moreover, (K+1) points obtained by equally dividing the pump blade centerline of the pump blade 31 into K parts are represented by Ppc(k) (where "K" is an integer of 2 or more, and "k" is an integer satisfying 1≤k≤K+1). A three-dimensional curve formed by the midpoints of segments connecting the points Ppc(k) of adjacent pump blades 31 in the range of k=1 to K+1 is defined as the pump flow path centerline Lpfc as the centerline of the pump flow path defined by the pump shell 30, the adjacent pump blades 31, and the pump core 32 of the pump impeller 3 (see FIG. 4). Note that the pump flow path centerline Lpfc may be determined by procedures (somewhat) different from those described above, as long as the pump flow path centerline Lpfc properly represents the center of the pump flow path, that is, the center of the flow of the hydraulic oil in the pump flow path.

Figure 5:
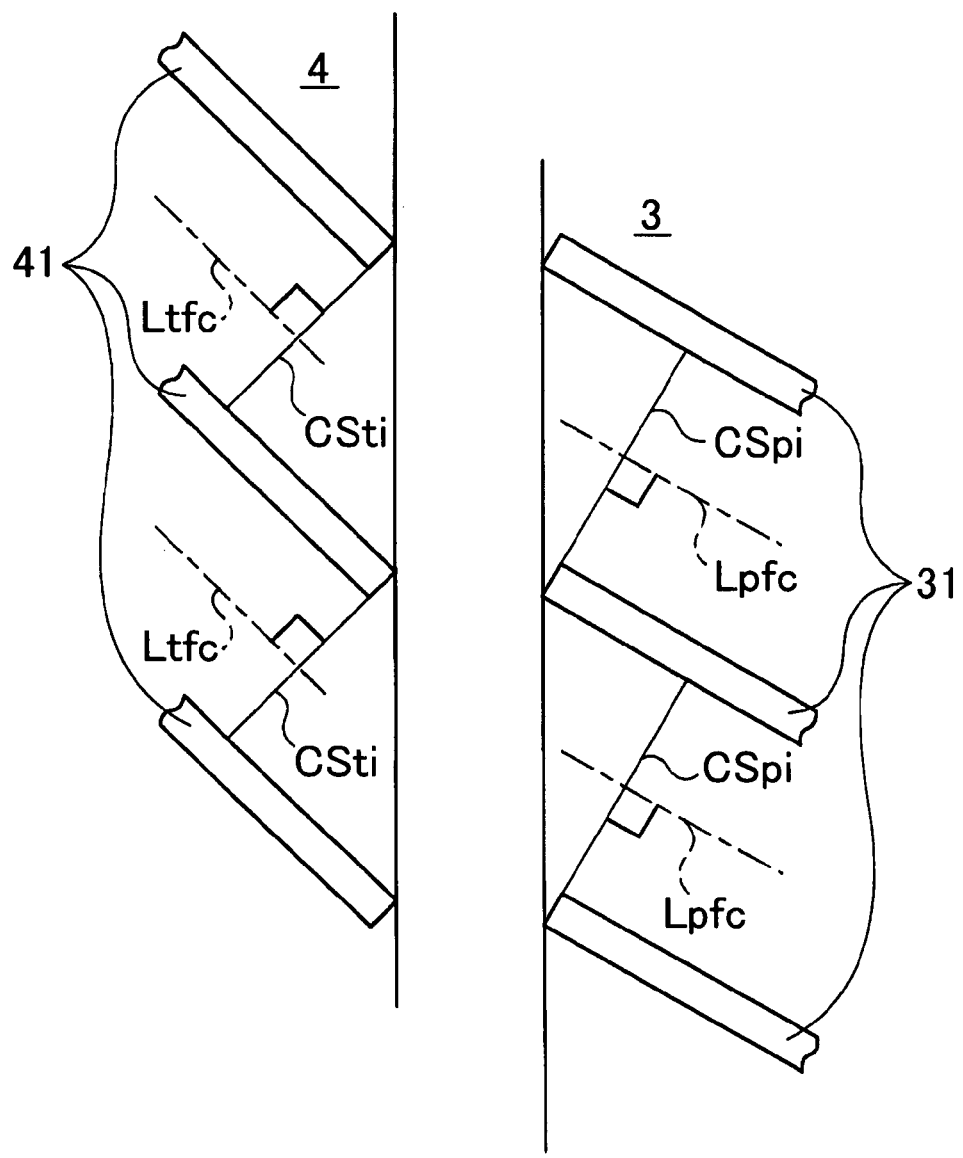
FIG. 5 is a schematic diagram for illustrating a cross section of a pump flow path at a pump inlet, and a cross section of a turbine flow path at a turbine inlet.

As evident from FIG. 5, defined as the cross section CSpi at the pump inlet of the pump flow path is a plane that extends perpendicular to the pump flow path centerline Lpfc near the pump inlet and completely crosses both of adjacent pump blades 31, and that is located closest to the turbine runner 4 (in the example of FIG. 5, a plane that extends perpendicular to the pump flow path centerline Lpfc near the pump inlet of the pump flow path, and that includes the side edge of one of adjacent pump blades 31 and completely crosses the other pump blade 31). Moreover, defined as the cross section CSpo at the pump outlet of the pump flow path is a plane that extends perpendicular to the pump flow path centerline Lpfc near the pump outlet and completely crosses both of adjacent pump blades 31, and that is located closest to the turbine runner 4 (e.g., a plane that extends perpendicular to the pump flow path centerline Lpfc near the pump outlet of the pump flow path, and that includes the side edge of one of adjacent pump blades 31 and completely crosses the other pump blade 31) (see FIG. 4).

Figure 6:
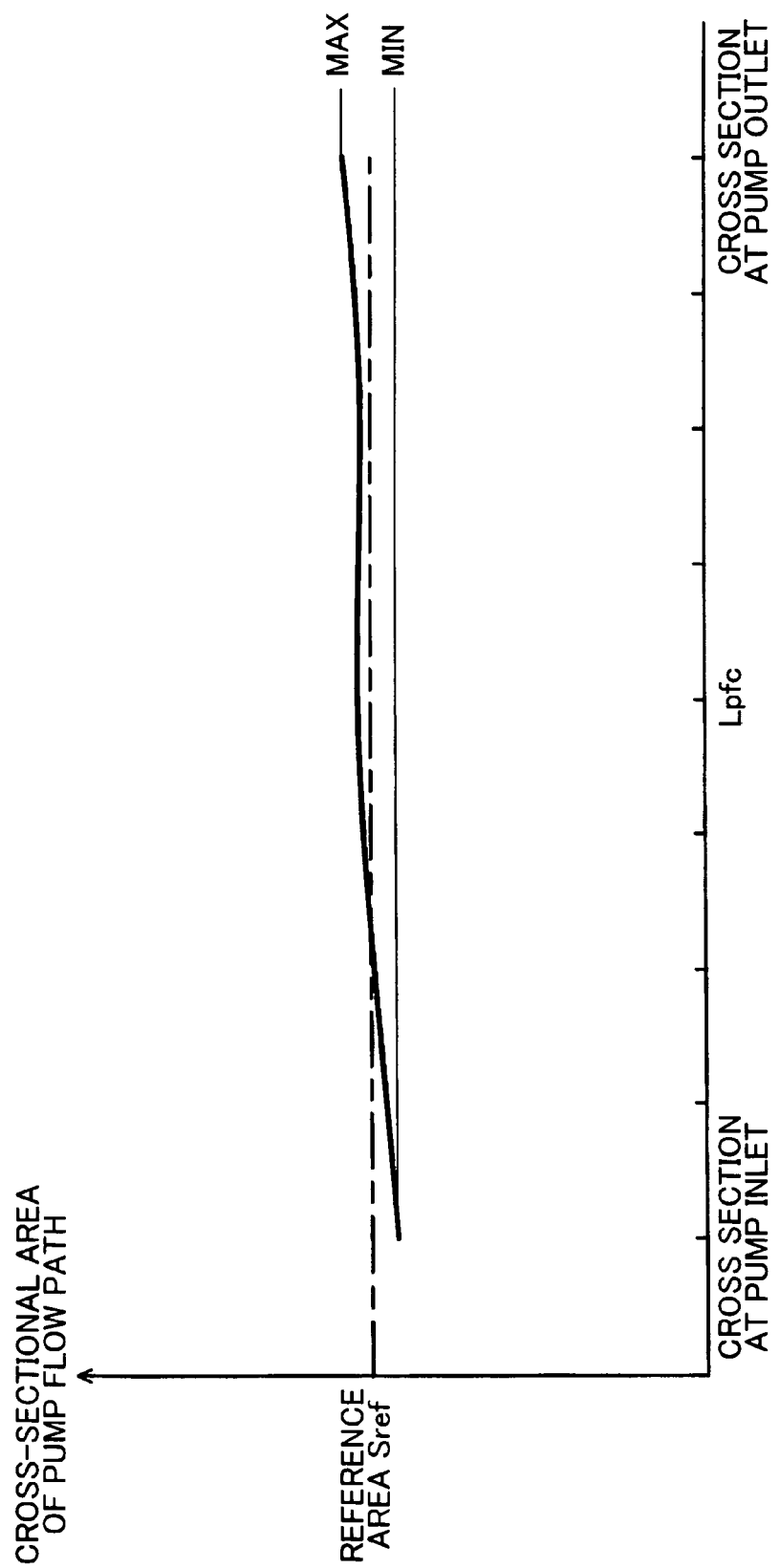
FIG. 6 is an explanatory diagram for illustrating the area of a cross section of a pump flow path perpendicular to a pump flow path centerline Lpfc in a pump impeller 3 included in the torque converter 1.

Regarding the pump impeller 3 having predetermined specifications, as shown in FIG. 6, the area of the cross section of the pump flow path extending perpendicular to the pump flow path centerline Lpfc is calculated at (M+1) points Pfc(m) obtained by equally dividing the pump flow path centerline Lpfc into M parts (where "M" is an integer of 2 or more, and in the example of FIG. 6, M=8) between the intersection of the cross section CSpi at the pump inlet of the pump flow path and the pump flow path centerline Lpfc and the intersection of the cross section CSpo at the pump outlet of the pump flow path and the pump flow path centerline Lpfc, and the average of the maximum and minimum values of the calculated cross-sectional areas of the pump flow path is defined as the reference area Sref (where "m" is an integer satisfying 1≤m≤M+1). As shown in FIG. 6, the cross-sectional area of the flow path defined between adjacent pump blades of the pump impeller is generally approximately constant from the pump inlet to the pump outlet, and in the example of FIG. 6, the area of the cross section at the point Pfc(1), namely the cross section CSpi at the pump inlet, has the minimum value, and the area of the cross section at the point Pfc(9), namely the cross section Cspo at the pump outlet, has the maximum value.

Moreover, (J+1) points obtained by equally dividing the inner peripheral edge (the boundary between the turbine blade 41 and the turbine core 42) of one turbine blade 41 fixed to the turbine shell 40 and the turbine core 42 into J parts in a three-dimensional space are represented by Pti(j), and (J+1) points obtained by equally dividing the outer peripheral edge (the boundary between the turbine shell 40 and the turbine blade 41) of the one turbine blade 41 into J parts in a three-dimensional space are represented by Pto(j). A three-dimensional curve formed by the midpoints of segments connecting the points Pti(j) and the points Pto(j) in the range of j=1 to J+1 is defined as the turbine blade centerline. Moreover, (K+1) points obtained by equally dividing the turbine blade centerline of the turbine blade 41 into K parts are represented by Ptc(k). A three-dimensional curve formed by the midpoints of segments connecting the points Ptc(k) of adjacent turbine blades 41 in the range of k=1 to K+1 is defined as the turbine flow path centerline Ltfc as the centerline of the turbine flow path defined by the turbine shell 40, the adjacent turbine blades 41, and the turbine core 42 of the turbine runner 4 (see FIG. 7). Note that the turbine flow path centerline Ltfc may be determined by procedures (somewhat) different from those described above, as long as the turbine flow path centerline Ltfc properly represents the center of the turbine flow path, that is, the center of the flow of the hydraulic oil in the turbine flow path.

In addition, as evident from FIG. 5, defined as the cross section CSti at the turbine inlet of the turbine flow path is a plane that extends perpendicular to the turbine flow path centerline Ltfc near the turbine inlet and completely crosses both of adjacent turbine blades 41, and that is located closest to the pump impeller 3 (in the example of FIG. 5, a plane that extends perpendicular to the turbine flow path centerline Ltfc near the turbine inlet of the turbine flow path, and that includes the side edge of one of adjacent turbine blades 41 and completely crosses the other turbine blade 41). Moreover, defined as the cross section CSto at the turbine outlet of the turbine flow path is a plane that extends perpendicular to the turbine flow path centerline Ltfc near the turbine outlet and completely crosses both of adjacent turbine blades 41, and that is located closest to the pump impeller 3 (e.g., a plane that extends perpendicular to the turbine flow path centerline Ltfc near the turbine outlet of the turbine flow path, and that includes the side edge of one of adjacent turbine blades 41 and completely crosses the other turbine blade 41) (see FIG. 7).

Figure 8:
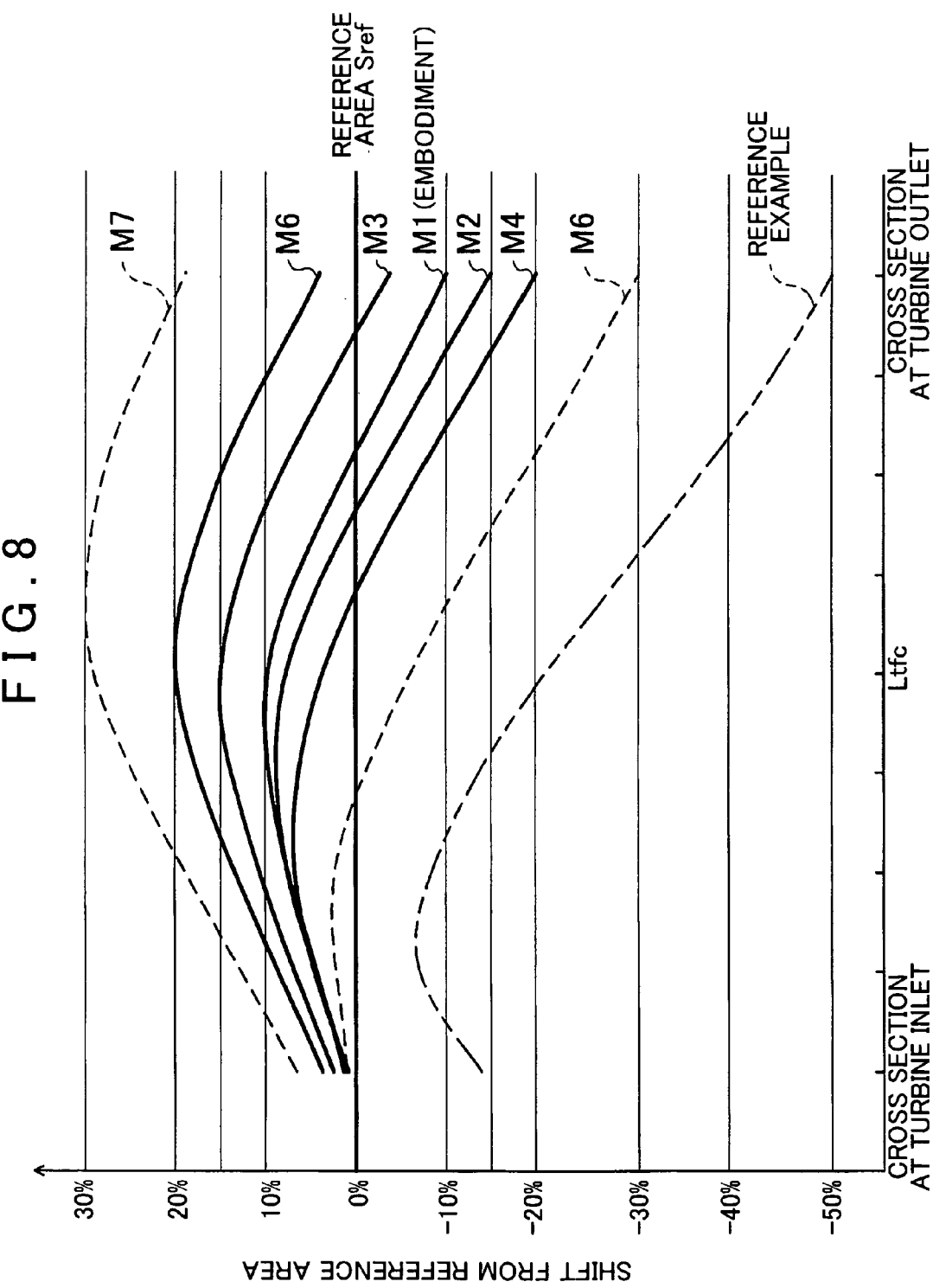
FIG. 8 is an explanatory diagram for illustrating a plurality of turbine runner models M1 to M7 used to analyze a variation range of the cross-sectional area of a turbine flow path, which is allowable to ensure the torque capacity.

In order to analyze a variation range of the cross-sectional area of the turbine flow path, which is allowable to satisfactorily ensure the torque capacity, a plurality of models M1 to M7 of the turbine runner (having the same outer diameter, the same core size, the same turbine outlet angle, the same turbine inlet angle, the same blade torsion angle, etc.), which can be used with the above pump impeller 3 and are different in turbine shell shape (flatness), were prepared, and the capacity coefficient C of the torque converter including the pump impeller 3 and the turbine runner of any one of the models M1 to M7 was obtained by computational fluid dynamics (CFD). As shown in FIG. 8, the models M1 to M7 have different ranges of the shift amount "|St(m)−Sref|/Sref" of the cross-sectional area St(m) from the reference area Sref, where St(m) represents the area of the cross section of the turbine flow path perpendicular to the turbine flow path centerline Ltfc at (M+1) points Pfc(m) that are obtained by equally dividing the turbine flow path centerline Ltfc into M parts (in the example of FIG. 8, M=8) between the intersection of the cross section CSti at the turbine inlet of the turbine flow path and the turbine flow path centerline Ltfc and the intersection of the cross section CSto at the turbine outlet of the turbine flow path and the turbine flow path centerline Ltfc.

The model M1 shown in FIG. 8 is the turbine runner 4 included in the torque converter 1 of the embodiment, and is designed so that the cross-sectional area St(m) of the turbine flow path satisfies |St(m)−Sref|/Sref≤0.1. The model M2 is designed so that the cross-sectional area St(m) of the turbine flow path satisfies −0.15≤|St(m)−Sref"|/Sref≤0.1. The model M3 is designed so that the cross-sectional area St(m) of the turbine flow path satisfies −0.05≤|St(m)−Srefl/Sref≤0.15. The model M4 is designed so that the cross-sectional area St(m) of the turbine flow path satisfies −0.2≤|St(m)−Srefl/Sref≤0.1. The model M5 is designed so that the cross-sectional area St(m) of the turbine flow path satisfies 0≤|St(m)−Srefl/Sref≤0.2. The model M6 is designed so that the cross-sectional area St(m) of the turbine flow path satisfies −0.3≤|St(m)−Srefl/Sref≤0.05. The model M7 is designed so that the cross-sectional area St(m) of the turbine flow path satisfies 0.05≤|St(m)−Srefl/Sref≤0.3. The two-dotted chain line (a reference example) in FIG. 8 shows the shift amount of the cross-sectional area St(m) of the turbine flow path obtained for a common turbine runner (a turbine runner structured so as to be approximately symmetrical to a pump impeller), from the reference area obtained for a pump impeller corresponding to this turbine runner. Note that in each example of FIG. 8, the cross section at the point Pfc(1) is the cross section CSti at the turbine inlet, and the cross section at the point Pfc(9) is the cross section CSto at the turbine outlet.

Figure 9:
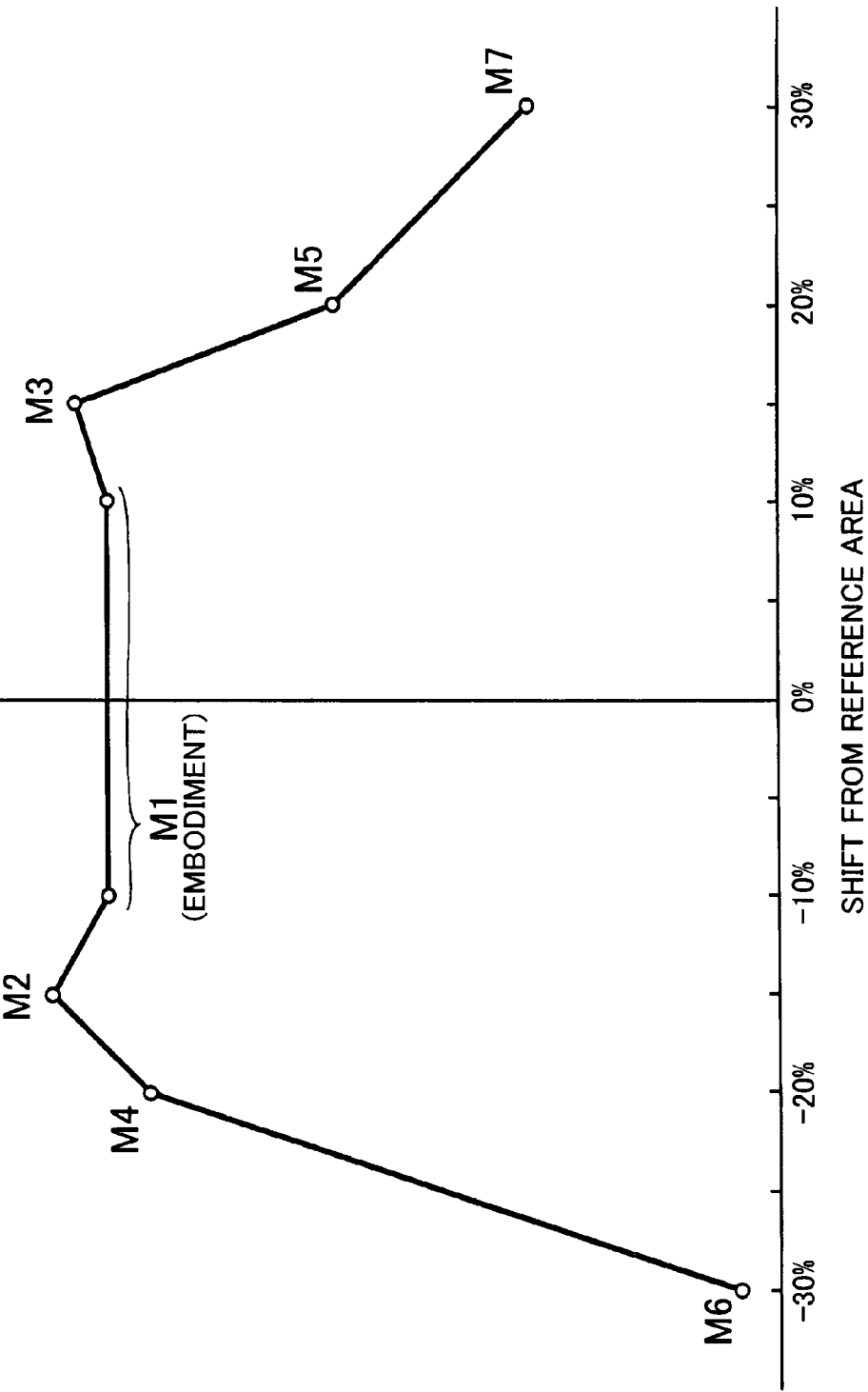
FIG. 9 is an explanatory diagram for illustrating the relation between the shift amount of the cross-sectional area of a turbine flow path from a reference area, and the capacity coefficient C of a torque converter including the pump impeller 3 and any one turbine runner of the models M1 to M7.

FIG. 9 is a diagram illustrating the relation between the shift amount "|St(m)−Srefl/Sref" of the cross-sectional area St(m) of the turbine flow path from the reference area Sref and the capacity coefficient C of the torque converter including the pump impeller 3 and the turbine runner of any one of the models M1 to M7. As evident from the figure, of the models M1 to M7, the torque converter including the turbine runner of any one of the models M1 to M3, that is, the turbine runner in which the shift amount of the cross-sectional area St(m) of the turbine flow path from the reference area Sref is ±15% or less, can have a practically highly satisfactory capacity coefficient C. The torque converter including the turbine runner of the model M4 or M5, that is, the turbine runner in which the shift amount of the cross-sectional area St(m) of the turbine flow path from the reference area Sref is ±20% or less, can have a practically sufficient capacity coefficient C, while it is difficult for the torque converter including the turbine runner of the model M6 or M7, that is, the turbine runner in which the shift amount of the cross-sectional area St(m) of the turbine flow path from the reference area Sref is ±30% or less, to have a practically sufficient capacity coefficient C.

Thus, it will be understood from the analysis result of FIG. 9 that by structuring the turbine runner 4 so that the cross-sectional area St(m) of a turbine flow path defined by the turbine shell 40, adjacent turbine blades 41, and the turbine core 42, which is perpendicular to the centerline of the turbine flow path, that is, the turbine flow path centerline Ltfc, satisfies |St(m)−Srefl/Sref≤0.2, and more preferably |St−Srefl/Sref≤0.15, the torus can be flattened and the torque converter 1 can be downsized while ensuring a practically sufficient torque capacity according to the outer diameter of the torus. Moreover, like the turbine runner 4 of the torque converter 1 of the embodiment, if the cross-sectional area St(m) of the turbine flow path perpendicular to the turbine flow path centerline Ltfc satisfies |(St(m)−Srefl/Sref≤0.2 (more preferably 0.15), a variation range of the cross-sectional area of the turbine flow path from the turbine inlet to the turbine outlet is relatively small. Thus, the occurrence of flow separation in the center portion (the region surrounded by broken line in FIG. 3) of the flow path from the turbine inlet to the turbine outlet, and the occurrence of flow separation on the turbine outlet side of the flow path can be suppressed, and torque transfer loss can also be reduced.

Figure 10:
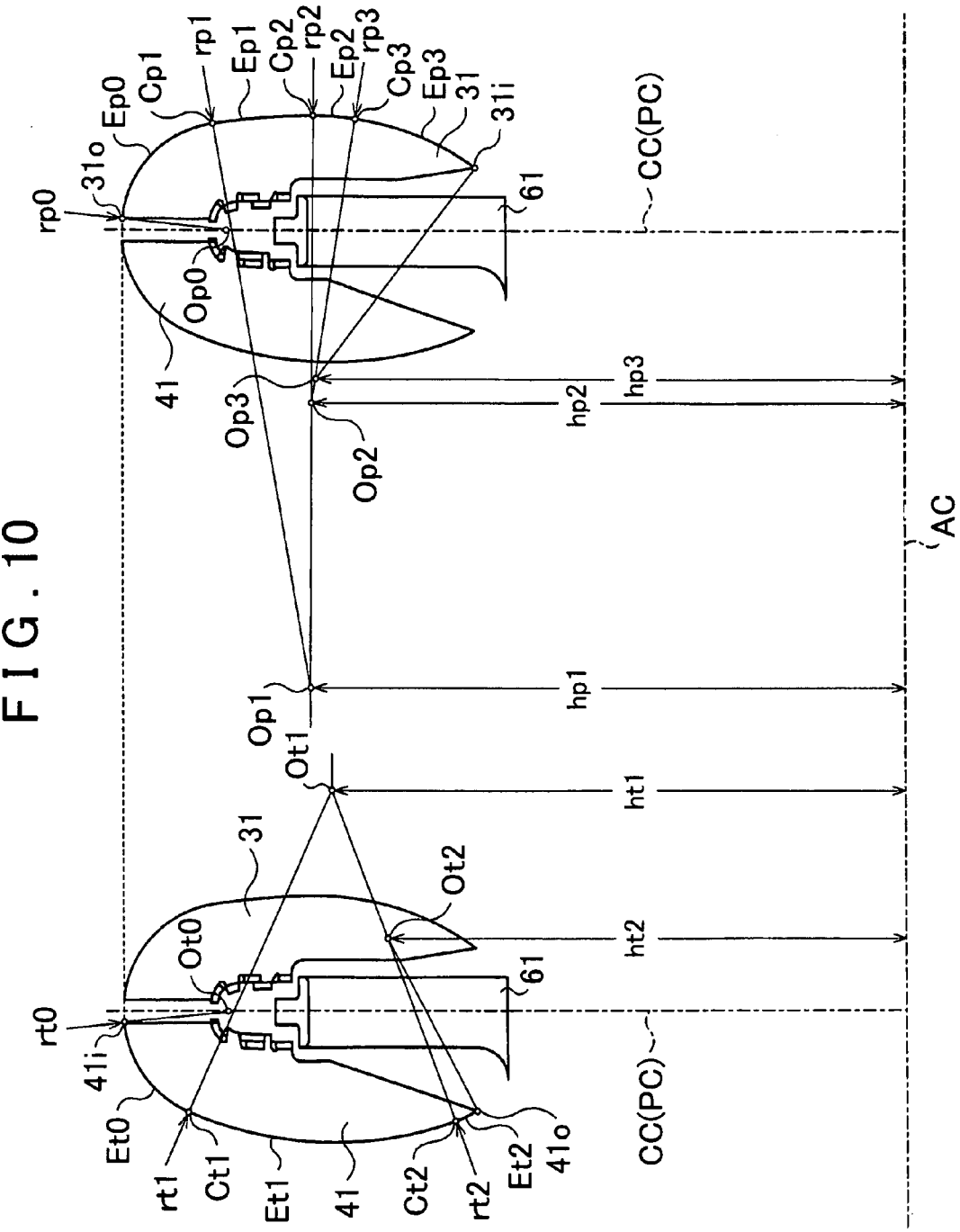
FIG. 10 is a schematic diagram for illustrating the structure of the torque converter 1.

The torque converter 1 of the embodiment will be described in more detail below with reference to FIG. 10. As shown in FIG. 10, when a pair of the pump blade 31 and the turbine blade 41, whose outlet outer peripheral end 31o and inlet outer peripheral end 41i face each other, are projected onto a plane that includes the device centerline CC and the rotation center axis AC of the pump impeller 3 and the turbine runner 4, the projected image of the pump blade 31 of the embodiment includes three curvature change points Cp1, Cp2, and Cp3 on the outer edge portion of the pump shell 30 side, and the projected image of the turbine blade 41 of the embodiment includes two curvature change points Ct1 and Ct2 on the outer edge portion of the turbine shell 40 side. Thus, three curvature change points corresponding to the curvature change points Cp1, Cp2, and Cp3 are included in the cross section (the shell inner periphery) of the pump shell 30 obtained when the pump shell 30 is cut along a plane that includes the rotation center axis AC, and two curvature change points corresponding to the curvature change points Ct1 and Ct2 are included in the cross section (the shell inner periphery) of the turbine shell 40 obtained when the turbine shell 40 is cut along the plane that includes the rotation center axis AC.

In the torque converter 1 of the embodiment, the radius of a curvature rt0 of a zeroth projected turbine outer edge portion Et0, which is an outer edge portion on the turbine shell 40 side extending from the inlet outer peripheral end 41i to the curvature change point Ct1 on the outermost peripheral side in the projected image of the turbine blade 41, has the same value as a radius of curvature rp0 of a zeroth projected pump outer edge portion Ep0, which is an outer edge portion on the pump shell 30 side extending from the outlet outer peripheral end 31o to the curvature change point Cp1 on the outermost peripheral side in the projected image of the pump blade 31. Curvature centers Ot0, Op0 of the radius of curvature rt0 and the radius of curvature rp0 match each other. Thus, the radius of curvature of the shell inner periphery from the point corresponding to the inlet outer peripheral end 41i to the point corresponding to the curvature change point Ct1 in the cross section of the turbine shell 40 obtained when the turbine shell 40 is cut along the plane that includes the rotation center axis AC is the same as the radius of curvature of the shell inner periphery from the point corresponding to the outlet outer peripheral end 31o to the point corresponding to the curvature change point Cp1 in the cross section of the pump shell 30 obtained when the pump shell 30 is cut along the plane that includes the rotation center axis AC. That is, as shown in FIG. 3, the outer contour line 41co of the turbine blade 41 has a symmetrical region where the outer contour line 41co of the turbine blade 41 is symmetrical to the outer contour line 31co of the pump blade 31, and an asymmetrical region where the outer contour line 41co of the turbine blade 41 is not symmetrical to the outer contour line 31co of the pump blade 31. The inlet outer peripheral end 41i of the turbine blade 41 is included in the symmetrical region, and an outlet inner peripheral end 41o of the turbine blade 41 is included in the asymmetrical region. This enables the hydraulic fluid to smoothly flow from the pump impeller 3 into the turbine runner 4, whereby the torque transfer loss can be reduced. Note that curvature change points provided in order to (closely) bond the blades to the shell, for example, are not included among the "curvature change points on the outermost peripheral side" in the present invention.

A radius of curvature rt1 of a first projected turbine outer edge portion Et1, which is an outer edge portion on the turbine shell 40 side extending from the curvature change point Ct1 on the outermost peripheral side to the second curvature change point Ct2 from the outer peripheral side in the projected image of the turbine blade 41, is smaller than a radius of curvature rp1 of a first projected pump outer edge portion Ep1, which is an outer edge portion on the pump shell 30 side extending from the curvature change point Cp1 on the outermost peripheral side to the second curvature change point Cp2 from the outer peripheral side in the projected image of the pump blade 31. A curvature center Ot1 of the first projected turbine outer edge portion Et1 is located closer to the rotation center axis AC side than a curvature center Op1 of the first projected pump outer edge portion Ep1. Thus, the length dt from the device centerline CC to the farthest point 41x of the turbine blade 41 located farthest from the device centerline CC in the extending direction of the rotation center axis AC can be made longer than the length dp from the device centerline CC to the farthest point 31x of the pump blade 31 located farthest from the device centerline CC in the extending direction of the rotation center axis AC. Since a sufficient cross-sectional area of the flow path defined between adjacent turbine blades 41 of the turbine runner 4 can be ensured in the center portion between the turbine inlet and the turbine outlet, the occurrence of flow separation in the center portion of the flow path can be suppressed, and the torque transfer loss can be reduced. Note that it is preferable that the difference (rp1−rt1) between the radius of curvature rp1 of the first projected pump outer edge portion Ep1 and the radius of curvature rt1 of the first projected turbine outer edge portion Et1 be, e.g., 30 to 40 mm.

Moreover, a radius of curvature rt2 of a second projected turbine outer edge portion Et2, which is an outer edge portion on the shell side extending from the second curvature change point Ct2 from the outer peripheral side in the projected image of the turbine blade 41 to the outlet inner peripheral end 41o in this projected image, is smaller than a radius of curvature rp2 of a second projected pump outer edge portion Ep2, which is an outer edge portion on the shell side extending from the second curvature change point Cp2 to the third curvature change point Cp3 from the outer peripheral side in the projected image of the pump blade 31. A curvature center Ot2 of the second projected turbine outer edge portion Et2 is located closer to the rotation center axis AC side than a curvature center Op2 of the second projected pump outer edge portion Ep2. Thus, a reduction in the cross-sectional area of the flow path defined between adjacent turbine blades 41 of the turbine runner 4 toward the turbine outlet can be suppressed (the amount of reduction can be reduced), whereby the occurrence of flow separation on the turbine outlet side of the flow path can be suppressed, and the torque transfer loss can be reduced.

In the torque converter 1 of the embodiment, the radius of curvature rt2 of the second projected turbine outer edge portion Et2, which is the outer edge portion on the shell side extending from the second curvature change point Ct2 (on the innermost periphery side) from the outer peripheral side in the projected image of the turbine blade 41 to the outlet inner peripheral end 41o in this projected image, is smaller than the radius of curvature rp3 of a third projected pump outer edge portion Ep3, which is an outer edge portion on the shell side extending from the third curvature change point Cp3 (on the innermost periphery side) from the outer peripheral side in the projected image of the pump blade 31 to an inlet inner peripheral end 31i in this projected image. The curvature center Ot2 of the second projected turbine outer edge portion Et2 is located closer to the rotation center axis AC than a curvature center Op3 of the third projected pump outer edge portion Ep3. Thus, the cross-sectional area on the turbine outlet side of the flow path defined between adjacent turbine blades 41 of the turbine runner 4 can be further increased.

Moreover, in the torque converter 1 of the embodiment, the dimensions and the like of the pump impeller 3, the turbine runner 4, and the stator 6 are determined so that the difference (Rtp−Rso) between the rotation radius Rtp of the pump blades 31 and the turbine blades 41 and the rotation radius Rso of the outer peripheral ends of the stator blades 61 is less than half of the difference (Rtp−Rsi) between the rotation radius Rtp of the pump blades 31 and the turbine blades 41 and the rotation radius Rsi of the inner peripheral ends of the stator blades 61 (see FIG. 3). Thus, the cross-sectional area on the turbine outlet side of the flow path defined between adjacent turbine blades 41 of the turbine runner 4 can be further increased, whereby the occurrence of flow separation on the turbine outlet side of this flow path can be suppressed, and the torque transfer loss can be reduced.

As described above, in the torque converter 1 of the embodiment, the attachment angle of the turbine blades 41 at the turbine outlet that is the fluid outlet of the turbine runner 4 is made smaller than the attachment angle of the turbine blades 41 that is the turbine inlet as the fluid inlet of the turbine runner 4. Moreover, the turbine runner 4 is structured so that the cross-sectional area St of the turbine flow path defined by the turbine shell 40, adjacent turbine blades 41, and the turbine core 42, which is perpendicular to the turbine flow path centerline Ltfc as the centerline of this turbine flow path, satisfies $|St-Sref1|/Sref \leq 0.2$, and more preferably $|St-Sref1|/Sref \leq 0.15$, where the reference area Sref is the average of the maximum and minimum values of the cross-sectional area of the pump flow path defined by the pump shell 30 of the pump impeller 3, adjacent pump blades 31, and the pump core 32, which is perpendicular to the pump flow path centerline Lpfc as the centerline of this pump flow path. Accordingly, the torus can be flattened and thus the torque converter 1 can be downsized while ensuring a practically sufficient torque capacity according to the outer diameter of the torus, and increasing torque amplification performance.

The torque converter 1 of the embodiment is highly preferable for vehicles in which lockup is performed by the lockup clutch mechanism 8 at a very low vehicle speed of, e.g., about 10 km/h. That is, by mounting on such a vehicle the torque converter 1 capable of suppressing a reduction in torque capacity and increasing the torque amplification performance, a required torque capacity is reduced, whereby the rotation radius Rtp of the pump blades 31 and the turbine blades 41 can be made significantly smaller than the rotation radius Rdp of the damper unit 7 (see FIG. 1) within such a range that can ensure the torque amplification performance. Thus, the overall torque converter 1, and also the overall transmission can be downsized.

In the torque converter 1 of the embodiment, the radius ro of the inscribed circle ICo inscribed on the outer contour line 41co of the turbine blade 41 on the turbine shell 40 side and the inner contour line 41ci of the turbine blade 41 on the turbine core 42 side at the turbine outlet is larger than the radius ri of the inscribed circle ICi inscribed on the outer contour line 41co and the inner contour line 41ci at the turbine inlet, and the outer contour line 41co of the turbine blade 41 extends outward in the extending direction of the rotation center axis AC on the turbine outlet side more than the outer contour line 31co of the pump blade 31 on the pump shell 30 side. Thus, even if the attachment angle of the turbine blades 41 at the turbine outlet is reduced, and the torus is flattened, a sufficient cross-sectional area of the turbine flow path defined by adjacent turbine blades 41 can be ensured in the region on the turbine outlet side, whereby a variation range of the cross-sectional area of the flow path from the turbine inlet to the turbine outlet can be reduced. As a result, in the torque converter 1, the torque amplification performance can be increased and the overall device can be downsized while suppressing a reduction in torque capacity, and suppressing flow separation near the turbine outlet.

Moreover, since the pump impeller 3 is an element for pumping the hydraulic oil from the turbine runner 4 to supply the pumped hydraulic oil again to the turbine runner 4, the attachment angle of the pump blades 31 need not be made small like the attachment angle of the turbine blades 41. Thus, by making the difference between the attachment angle of the pump blades 31 at the pump inlet and the attachment angle of the pump blades 31 at the pump outlet smaller than the difference between the attachment angle of the turbine blades 41 at the turbine inlet and the attachment angle of the turbine blades 41 at the turbine outlet, the variation range of the cross-sectional area of the flow path defined between adjacent pump blades 31 can be further reduced. This eliminates the need to make the pump impeller 3 extend outward like the turbine runner 4, whereby the torque converter 1 can be further downsized.

The straight line that extends through the rotation center axis AC of the pump impeller 3 and the turbine runner 4 and the midpoint (the center) between the outlet outer peripheral end 31o of the pump blade 31 and the inlet outer peripheral end 41i of the turbine blade 41 which face each other, and that expends perpendicular to the rotation center axis AC is defined as the device centerline CC. In the case where the device centerline CC is defined as described above, the torque converter 1 of the embodiment is structured so that the length dt from the device centerline CC to the farthest point 41x of this turbine blade 41 located farthest from the device centerline CC in the extending direction of the rotation center axis AC is longer than the length dp from the device centerline CC to the farthest point 31x of this pump blade 31 located farthest from the device centerline CC in the extending direction of the rotation center axis AC, and the torque converter 1 has a torus (an annular flow path) that is asymmetrical with respect to the device centerline CC. Thus, regarding the pair of the pump blade 31 and the turbine blade 41, the length dt from the device centerline CC to the farthest point 41x of the turbine blade 41 located farthest from the device centerline CC in the extending direction of the rotation center axis AC is made longer than the length dp from the device centerline CC to the farthest point 31x of the pump blade 31 located farthest from the device centerline CC in the extending direction of the rotation center axis AC. This enables the outer contour line 41co of the turbine blade 41 to extend outward more properly in the extending direction of the rotation center axis AC in the region on the turbine outlet side, as compared to the outer contour line 31co of the pump blade 31, and a variation range of the cross-sectional area of the flow path from the turbine inlet to the turbine outlet can be reduced as much as possible. As a result, when the variation range of the cross-sectional area St(m) of the turbine flow path is within the above range, the torus can be flattened and thus the torque converter 1 can be downsized while ensuring a torque capacity according to the outer diameter of the torus.

Moreover, in the torque converter 1 of the embodiment, the $n^{th}$ (where "n" is any integer of 1 or more) projected turbine outer edge portion Etn, which is an outer edge portion on the shell side extending from the $n^{th}$ curvature change point Ctn to the $(n+1)^{th}$ curvature change point Ctn+1 from the outer peripheral side in the projected image of the turbine blade 41 or to the outlet inner peripheral end 41o in the projected image of the turbine blade 41, has a smaller radius of curvature than the $n^{th}$ projected pump outer edge portion Epn, which is an outer edge portion on the shell side, extending from the $n^{th}$ curvature change point Cpn to the $(n+1)^{th}$ curvature change point Cpn+1 from the outer peripheral side in the projected image of the pump blade 31 or to the inlet inner peripheral end 31i in the projected image of the pump blade 31, and the curvature center Otn of the $n^{th}$ projected turbine outer edge portion Etn is located closer to the rotation center axis AC than the curvature center Opn of the $n^{th}$ projected pump outer edge portion Epn. Moreover, the radius of curvature of the shell inner periphery from the point corresponding to the $n^{th}$ curvature change point Ctn in the cross section of the turbine shell 40 obtained when the turbine shell 40 is cut along the plane including the rotation center axis AC, to the point corresponding to the $(n+1)^{th}$ curvature change point Ctn+1 or the outlet inner peripheral end 41o in the projected image of the turbine blade 41 is smaller than the radius of curvature of the shell inner periphery from the point corresponding to the $n^{th}$ curvature change point Cpn in the cross section of the pump shell 30 obtained when the pump shell 30 is cut along the plane including the rotation center axis AC, to the point corresponding to the $(n+1)^{th}$ curvature change point Cpn+1 or the inlet inner peripheral end 31i in the projected image of the pump blade 31. Furthermore, the curvature center of the shell inner periphery from the point corresponding to the curvature change point Ctn in the cross section of the turbine shell 40 obtained when the turbine shell 40 is cut along the plane including the rotation center axis AC, to the point corresponding to the $(n+1)^{th}$ curvature change point Ctn+1 or the outlet inner peripheral end 41o is located closer to the rotation center axis AC than the curvature center of the shell inner periphery from the point corresponding to the curvature change point Cpn in the cross section of the pump shell 30 obtained when the pump shell 30 is cut along the plane including the rotation center axis AC, to the point corresponding to the $(n+1)^{th}$ curvature change point Cpn+1 or the outlet inner peripheral end 41o. Thus, the length dt from the device centerline CC to the farthest point 41x of the corresponding turbine blade 41 located farthest from the device centerline CC in the extending direction of the rotation center axis AC can be made longer than the length dp from the device centerline CC to the farthest point 31x of the corresponding pump blade 31 located farthest from the device centerline CC in the extending direction of the rotation center axis AC.

Note that in order to achieve both an improvement in torque capacity and device downsizing in the torque converter 1 of the embodiment, a ratio dt/dp of the length dt from the device centerline CC to the farthest point 41x located farthest from the device centerline CC in the extending direction of the rotation center axis AC of the turbine blade 41 to the length dp from the device centerline CC to the farthest point 31x located farthest from the device centerline CC in the extending direction of the rotation center axis AC of the pump blade 31 may be set in the range of $1.05 \leq dt/dp \leq 1.20$, for example. If a flatness A of the torque converter 1 is expressed as $\Lambda=(dt+dp)/(Rtp-Rsi)$, the torque converter 1 is preferably structured so as to satisfy $0.5 \leq \Lambda \leq 0.7$, for example. Moreover, the projected image of the pump blade 31 of the embodiment described above includes the three curvature change points Cp1, Cp2, and Cp3 in the outer edge portion on the pump shell 30 side, and the projected image of the turbine blade 41 of the embodiment described above includes the two curvature change points Ct1 and Ct2 in the outer edge portion on the turbine shell 40 side. However, the number of curvature change points in the projected images of the pump blade 31 and the turbine blade 41 is not limited to these examples, and may be arbitrarily determined.

Although a mode for carrying out the present invention is described above based on an embodiment, it is to be understood that the present invention is not limited to the above embodiment and various modifications are conceivable without departing from the scope of the present invention.

The present invention can be used in the manufacturing field of fluidic torque transfer devices such as torque converters, and the like.

The invention claimed is:

1. A fluidic torque transfer device, comprising:
a pump impeller that includes a pump shell, a pump blade attached to the pump shell, and a pump core attached to the pump blade;
a turbine runner that includes a turbine shell, at least first and second turbine blades attached to the turbine shell along respective first and second outer contour lines, and a turbine core attached to the turbine blades; and
a stator that includes a stator blade and rectifies a flow of a hydraulic fluid from the turbine runner to the pump impeller, wherein
an attachment angle of the turbine blades at a fluid outlet of the turbine runner is smaller than the attachment angle of the turbine blades at a fluid inlet of the turbine runner, the attachment angle being defined as an average of (a) an absolute value of an angle of an endpoint of the first turbine blade with respect to a perpendicular in a y-direction, and (b) an angle formed by a tangent to a point of contact between the adjacent second turbine blade and an inscribed circle with respect to the perpendicular in the y-direction when the inscribed circle contacting the first turbine blade outer contour line adjacent to the first turbine blade endpoint is drawn, and
the turbine runner is structured so that a cross-sectional area St of a turbine flow path defined by the turbine shell, adjacent turbine blades, and the turbine core, which is perpendicular to a centerline of the turbine flow path, satisfies |St−Sref|/Sref≤0.2, where a reference area Sref is an average of maximum and minimum values of a cross-sectional area of a pump flow path defined by the pump shell, adjacent pump blades, and the pump core of the pump impeller, which is perpendicular to a centerline of the pump flow path.

2. The fluidic torque transfer device according to claim 1, wherein
the turbine runner is structured so that the cross-sectional area St of the turbine flow path satisfies |St−Sref|/Sref≤0.15.

3. The fluidic torque transfer device according to claim 2, wherein
a radius of an inscribed circle inscribed at the fluid outlet of the turbine runner on an outer contour line of the turbine blade on the turbine shell side and an inner contour line of the turbine blade on the turbine core side is larger than a radius of an inscribed circle inscribed on the outer contour line and the inner contour line at the fluid inlet of the turbine runner, and
the outer contour line of the turbine blade extends outward in an extending direction of a rotation center axis of the pump impeller and the turbine runner on the fluid outlet side of the turbine runner more than an outer contour line of the pump blade on the pump shell side.

4. The fluidic torque transfer device according to claim 3, wherein
a length from a device centerline to a farthest portion located farthest from the device centerline in the extending direction of the rotation center axis of the turbine blade is longer than a length from the device centerline to a farthest portion located farthest from the device centerline in the extending direction of the rotation center axis of the pump blade, wherein the device centerline is a line that extends through a center between a fluid outlet outer peripheral end of the pump blade and a fluid inlet outer peripheral end of the turbine blade that face each other, extends through the rotation center axis of the pump impeller and the turbine runner, and extends perpendicular to the rotation center axis.

5. The fluidic torque transfer device according to claim 4, wherein the outer contour line of the turbine blade has a symmetrical region where the outer contour line of the turbine blade is symmetrical to the outer contour line of the pump blade, and an asymmetrical region where the outer contour line of the turbine blade is not symmetrical to the outer contour line of the pump blade, wherein the symmetrical region includes the fluid inlet outer peripheral end of the turbine blade and the asymmetrical region includes a fluid outlet inner peripheral end of the turbine blade.

6. The fluidic torque transfer device according to claim 1, wherein
a radius of an inscribed circle inscribed at the fluid outlet of the turbine runner on an outer contour line of the turbine blade on the turbine shell side and an inner contour line of the turbine blade on the turbine core side is larger than a radius of an inscribed circle inscribed on the outer contour line and the inner contour line at the fluid inlet of the turbine runner, and
the outer contour line of the turbine blade extends outward in an extending direction of a rotation center axis of the pump impeller and the turbine runner on the fluid outlet side of the turbine runner more than an outer contour line of the pump blade on the pump shell side.

7. The fluidic torque transfer device according to claim 6, wherein
a length from a device centerline to a farthest portion located farthest from the device centerline in the extending direction of the rotation center axis of the turbine blade is longer than a length from the device centerline to a farthest portion located farthest from the device centerline in the extending direction of the rotation center axis of the pump blade, wherein the device centerline is a line that extends through a center between a fluid outlet outer peripheral end of the pump blade and a fluid inlet outer peripheral end of the turbine blade that face each other, extends through the rotation center axis of the pump impeller and the turbine runner, and extends perpendicular to the rotation center axis.

8. The fluidic torque transfer device according to claim 6, wherein the outer contour line of the turbine blade has a symmetrical region where the outer contour line of the turbine blade is symmetrical to the outer contour line of the pump blade, and an asymmetrical region where the outer contour line of the turbine blade is not symmetrical to the outer contour line of the pump blade, wherein the symmetrical region includes the fluid inlet outer peripheral end of the turbine blade and the asymmetrical region includes a fluid outlet inner peripheral end of the turbine blade.

9. The fluidic torque transfer device according to claim 1, wherein the y-direction is a radial direction in which the turbine blades extend.

* * * * *